Dec. 10, 1957  M. L. MULVEY  2,816,201
ELECTRICALLY HEATED PLANK
Filed June 8, 1956
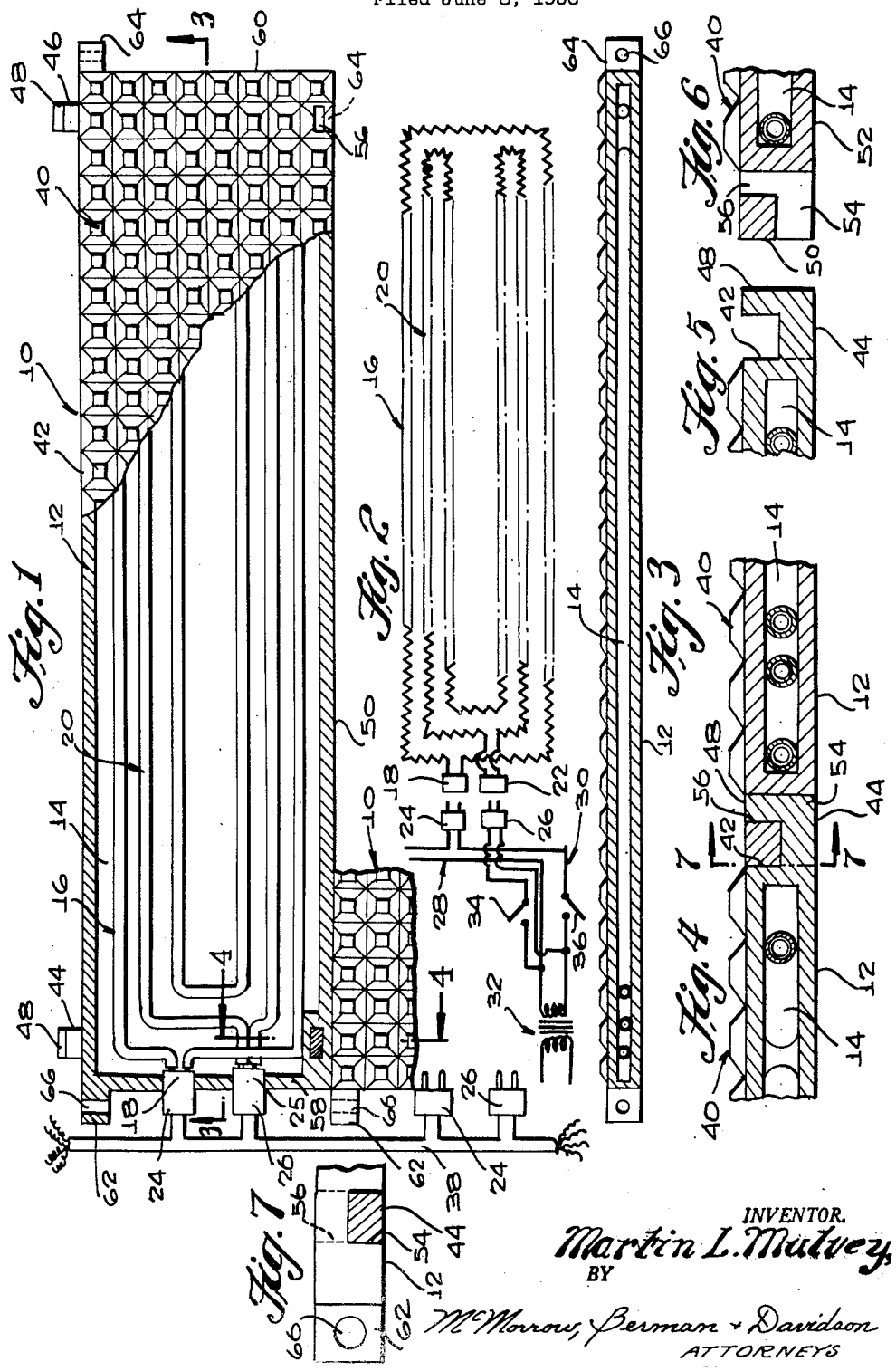
INVENTOR.
Martin L. Mulvey,
BY
McMorrow, Berman & Davidson
ATTORNEYS United States Patent Office 2,816,201
Patented Dec. 10, 1957

2,816,201

ELECTRICALLY HEATED PLANK

Martin L. Mulvey, Landing, N. J.

Application June 8, 1956, Serial No. 590,317

3 Claims. (Cl. 219—19)

This invention relates to a novel electrically heated plank usable as an outdoor surface cover for dissipating snow, ice or sleet.

A primary object of invention is to provide a novel electrically heated plank including hook means cooperating with cooperating portions on similar electrically heated planks to provide a composite surface covering for platforms, walkways, driveways and the like whereby ready pedestrian and vehicle traversing may be accomplished during adverse weather conditions.

A further object of invention in conformance with that set forth is to provide a novel electrically heated plank including a hollow rectangular body member containing suitable electric heating element means and means for supplying a low voltage current thereto, said body member including lateral hook elements on one side edge thereof, and notch and aperture portions on an opposite side edge portion, said hook and notch and aperture portions being respectively engageable with notch and aperture, and hook portions on a similar electric heating plank for providing a readily assembled and disassembled composite heating surface covering.

Other objects of invention in conformance with that set forth reside in the specific details of the novel electrically heated plank.

And yet another object of invention in conformance with that set forth is to provide a novel electrically heated plank of the character involved which is readily and economically manufactured, easily installed and maintained, and highly practical, serviceable and utilitarian for the purpose intended.

These together with other objects and advantages which will subsequently become apparent reside in the details of construction and operation as more fully hereinafter described and claimed, reference being had to the accompanying drawing forming a part hereof, wherein like numerals refer to like parts throughout, and in which:

Figure 1 is a top plan view of an electrically heated plank of the invention, portions being broken away and shown in section for clarity, a fragmentary portion of an electrically heated plank being shown in the position assumed when a composite surface covering is formed;

Figure 2 is a diagrammatic view showing a plurality of heating elements utilized in the electrically heated plank of the invention, and the circuits for said heating elements;

Figure 3 is a sectional view taken substantially on line 3—3 of Figure 1;

Figure 4 is an enlarged fragmentary sectional view taken substantially on line 4—4 of Figure 1, showing the manner in which the edge portions of a pair of the electrically heated planks are retained adjacent each other;

Figure 5 is an enlarged fragmentary sectional view showing a portion of Figure 4, showing the manner in which the hook elements extend laterally from a side edge portion of the electrically heated plank;

Figure 6 is a fragmentary sectional view of a portion of Figure 4 showing the manner in which the notch and aperture portions are formed in the opposite side edge of the novel electrically heated plank; and Figure 7 is a fragmentary sectional view taken substantially on line 7—7 of Figure 4.

Referring to the drawing in detail, the novel electrically heated plank is indicated generally at 10 and includes a hollow body member 12 constructed of any suitable material—aluminum, steel etc. depending on the strength required for a particular installation. The body member 12 includes a suitably conformed recess portion 14 having disposed therein a heating element assembly 16, suitably insulated, and extending about the inner periphery of the recess portion 14. The heating element assembly 16 is connected to a suitable female socket element 18 integral with one end wall of the body member 12. A second heating element assembly 20 is disposed within the recess portion 14 extending longitudinally of the body member 12 and being connected to a suitable female connection element 22 also integrally disposed in the end wall of the body member in spaced relationship from the female socket element 18.

The female socket elements 18 and 22 are respectively connected to male plug elements 24 and 26 which are connected by suitable electrical circuits 28 and 30, respectively, to a suitable transformer assembly 32. The electrical circuits 28 and 30 respectively include therein switch assemblies 34 and 36 permitting independent control of the heating element assemblies 16 and 20, respectively. The electrical circuits 28 and 30 will have the conducting wires thereof disposed in a suitable waterproofing insulating jacket 38 for preventing accidental shorting out of the electrical circuits.

The upper surface of the body member 12 will be suitably scored or serrated as indicated generally at 40 for providing a desirable traction surface to the electrically heated plank affording ready traction for vehicles or pedestrians thereover. The electrically heated plank will come in random sizes suitable for a particular installation depending upon the conditions involved.

Extending from edge portion 42 of the body member 12 are a pair of longitudinally spaced laterally extending hook elements 44 and 46 which are integral with the body member 12 and which include an upwardly extending angular hook end portion 48. Extending transversely into the other edge 50 of the body member 12 and into the lower surface 52 thereof are notch portions 54 in transverse alignment with the hook elements 44 and 46, said notch portions 54 communicating with a transverse aperture portion 56 conforming to the hook end portion 48 of the previously mentioned hook elements. Observing Figures 4 through 6, it will be noted that the hook end portions 48 are readily received in the notch and aperture portions 54 and 56 thus forming the composite surface covering for the purposes previously mentioned.

Extending laterally from the end portions 58 and 60 of the body member 12 are integral loop elements 62 and 64, respectively, which are transversely apertured as seen at 66 in Figure 1, the aperture portion 66 of one body member 12 being alignable with those on an adjacent body member 12, for the purpose of receiving therethrough a suitable locking bar, chain or the like (not shown) in the event it appears that the electrically heated planks are subject to being stolen, for example.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. An electrically heated plank for constructing a heated surface for dissipating ice, snow and the like from weather exposed surfaces comprising a rectangular hollow body member, electric heating element means disposed within the body member, means for supplying current to the heating element means, hook means on opposite side edge portions of the body member for engagement with cooperating hook means on a similar body member for providing a composite heated surface, said hook means comprising male hook elements extending laterally in longitudinally spaced relationship from one side edge portion of the body member including an angular terminal end portion extending toward the surface of the body member in spaced relation from the one side edge portion, and female hook portions in transverse alignment with the male hook portions and including lateral notch portions extending into the opposite side edge and lower surface of the body member and terminating in a transverse aperture portion through the body member for receiving therein male hook elements of an adjacent electrically heated plank.

2. An electrically heated plank for constructing a heated surface for dissipating ice, snow and the like from weather exposed surfaces comprising a rectangular hollow body member, electric heating element means disposed within the body member, means for supplying current to the heating element means, hook means on opposite side edge portions of the body member for engagement with cooperating hook means on a similar body member for providing a composite heated surface, said electric heating element means comprising plural independently controlled heating element assemblies in communication with separate low voltage circuits whereby different heat values may be provided in the body member.

3. An electrically heated plank for constructing a heated surface for dissipating ice, snow and the like from weather exposed surfaces comprising a rectangular hollow body member, electric heating element means disposed within the body member, means for supplying current to the heating element means, hook means on opposite side edge portions of the body member for engagement with cooperating hook means on a similar body member for providing a composite heated surface, said body member including a loop element extending laterally from the end portion of the body member and including an aperture portion therethrough for alignment with a similar aperture portion in a loop element on an adjacent plank member for receiving lock means therethrough.

References Cited in the file of this patent

UNITED STATES PATENTS

| | | |
|---|---|---|
| 1,301,995 | Arthur | Apr. 29, 1919 |
| 1,349,136 | Lillard | Aug. 10, 1920 |
| 2,762,896 | Pendleton | Sept. 11, 1956 |
| 2,771,164 | Scurlock | Nov. 20, 1956 |